US009639848B1

(12) United States Patent
Belle et al.

(10) Patent No.: US 9,639,848 B1
(45) Date of Patent: May 2, 2017

(54) DIFFUSION PREDICTION BASED ON INDICATOR SCORING

(71) Applicant: AMAZON TECHNOLOGIES, INC., Reno, NV (US)

(72) Inventors: Jeffrey L. Belle, Seattle, WA (US); Patrick Ludvig Bajari, Bellevue, WA (US); Jeffrey Paul Helbling, Seattle, WA (US); Kelly Christina Paulson, Seattle, WA (US); Ana Maria Mocanu, Bellevue, WA (US); Vikram Sathyanarayana Anbazhagan, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 358 days.

(21) Appl. No.: 14/028,496

(22) Filed: Sep. 16, 2013

(51) Int. Cl.
G06Q 30/00 (2012.01)
G06Q 10/00 (2012.01)
G06Q 30/02 (2012.01)

(52) U.S. Cl.
CPC .............. G06Q 30/0202 (2013.01)

(58) Field of Classification Search
CPC ......... G06Q 10/00–50/00; G06Q 90/00; G06F 1/00–21/00
USPC .............................. 705/7.11–7.42
See application file for complete search history.

(56) References Cited

U.S. PATENT DOCUMENTS

| 7,536,322 | B1* | 5/2009 | Selinger et al. ............ 705/26.5 |
| 7,680,685 | B2* | 3/2010 | Ouimet et al. .............. 705/7.31 |
| 7,890,363 | B2* | 2/2011 | Gross ........................... 705/7.31 |
| 8,140,388 | B2* | 3/2012 | Gross ........................... 705/14.41 |
| 8,180,689 | B2* | 5/2012 | Bezos et al. ................ 705/26.7 |
| 8,412,706 | B2* | 4/2013 | McGuire et al. ............ 707/732 |
| 8,700,489 | B2* | 4/2014 | Yoshii .................... G06Q 30/02 705/26.7 |
| 2002/0169657 | A1* | 11/2002 | Singh et al. .................... 705/10 |
| 2004/0122686 | A1* | 6/2004 | Hill et al. ......................... 705/1 |
| 2004/0167814 | A1* | 8/2004 | Hawks .................. G06Q 30/02 705/20 |
| 2004/0249700 | A1* | 12/2004 | Gross ............................. 705/10 |
| 2004/0260574 | A1* | 12/2004 | Gross ............................... 705/1 |
| 2004/0260600 | A1* | 12/2004 | Gross ............................. 705/10 |
| 2005/0246358 | A1* | 11/2005 | Gross ............................ 707/100 |
| 2008/0046317 | A1* | 2/2008 | Christianson et al. ......... 705/14 |
| 2008/0091483 | A1* | 4/2008 | Blouin et al. ..................... 705/7 |

(Continued)

OTHER PUBLICATIONS

Bayus, Barry L., Saman Hong, and Russell P. Labe. "Developing and Using Forecasting Models of Consumer Durables the Case of Color Television." Journal of Product Innovation Management 6.1 (1989): 5-19.*

(Continued)

Primary Examiner — Alan S Miller
(74) Attorney, Agent, or Firm — Lindauer Law, PLLC

(57) ABSTRACT

Based on historical data describing product sales or other types of transactions, indicator scores may be calculated for users who have purchased, reviewed, or otherwise consumed products, the indicator scores based on subsequent diffusion of the products. Measured, current activities of the scored users with regard to another product may then be employed to develop a diffusion model that predicts the future sales of the other product over time. The diffusion model may be employed to determine product pricing, marketing, distribution, or acquisition.

20 Claims, 10 Drawing Sheets

(56) References Cited

U.S. PATENT DOCUMENTS

| | | | | |
|---|---|---|---|---|
| 2011/0119148 A1* | 5/2011 | Yoshii | ............... | G06Q 30/02 |
| | | | | 705/26.7 |
| 2012/0215597 A1* | 8/2012 | Ross | ............... | G06Q 30/0201 |
| | | | | 705/14.1 |
| 2013/0103535 A1* | 4/2013 | Slaney | ............... | G06Q 30/0282 |
| | | | | 705/26.7 |
| 2013/0211913 A1* | 8/2013 | Ross | ............... | G06Q 30/02 |
| | | | | 705/14.53 |
| 2013/0346150 A1* | 12/2013 | Beddo et al. | ............... | 705/7.31 |

OTHER PUBLICATIONS

Hahn, Minhi, et al. "Analysis of new product diffusion using a four-segment trial-repeat model." Marketing Science 13.3 (1994): 224-247.*

Aral, Sinan. "Commentary-identifying social influence: A comment on opinion leadership and social contagion in new product diffusion." Marketing Science 30.2 (2011): 217-223.*

Wright, Malcolm, Clinton Upritchard, and Tony Lewis. "A validation of the Bass new product diffusion model in New Zealand." Marketing Bulletin-Department of Marketing Massey University 8 (1997): 15-29.*

Lilien, Gary L., Arvind Rangaswamy, and A. D. Bruyn. "The Bass model: Marketing engineering technical note." Principles of Marketing Engineering (2007).*

Nam, Sungjoon. "Demystifying the Bass Diffusion Model: the hidden role of distribution channel." Rutgers Business School (Feb. 2011).*

Bass, Frank M. "A New Product Growth for Model Consumer Durables." Management Science, vol. 50, No. 12, Ten Most Influential Titles of "Management Science's" First Fifty Years (Dec. 2004), pp. 1825-1832.*

* cited by examiner

DIFFUSION PREDICTION BASED ON INDICATOR SCORING

BACKGROUND

Businesses that offer products to customers may incur expenses to invest in equipment and facilities, hire and train personnel, expand the scope of their business, or market and advertise their products. In deciding whether to incur such expenses, businesses may seek information regarding which products are likely to be successful or unsuccessful in the future. Given the subjective nature of customer demand, it may be difficult to determine whether any particular product is likely to be successful.

Figure 1:
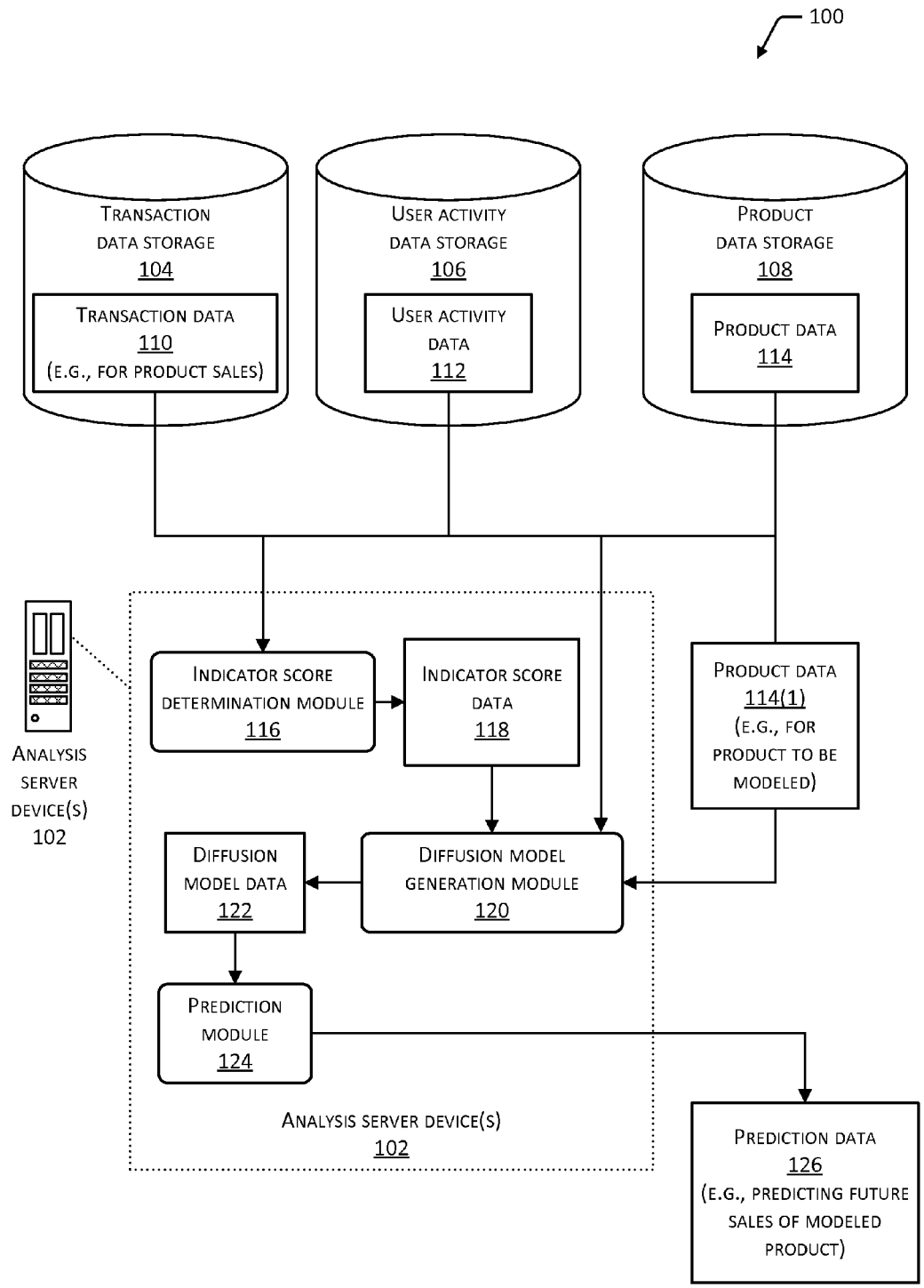
FIG. 1 depicts an environment for determining indicator scores for a plurality of users and predicting future product transactions based on the indicator scores and on the observed activities of the users.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for predicting the performance, popularity, sales, or diffusion of a product. Such predictions may be based on observed activities of users with regard to the product, and based on indicator scores which quantify the previous sales of other products that may have been the subject of user activities. In many cases, particular users or customers of certain products may develop an opinion of products that go on to be successful, or unsuccessful, with respect to the number of sales, popularity, or diffusion among a population. For example, certain customers may tend to become early fans of books or games that go on to be bestsellers, or early fans of television shows that go on to be widely viewed, top rated, or otherwise successful, early in the life cycle or soon after the release of such products. These users may be described as mavens, opinion leaders, taste leaders, or fashion forward users, given that their behavior toward a product early in its life cycle (e.g., soon after a product release or publication) may indicate a likelihood that the product may go on to be successful (e.g., become a best-selling book or game, a popular music album, or a high grossing movie).

In implementations, historical user activity data and historical product transaction data (e.g., sales data) may be analyzed to identify users who perform indicating activities that demonstrate the user's opinion (substantially positive, negative, or otherwise) toward a product. Such indicating activities may include a purchase of the product by the user, or a published positive review or recommendation of the product by the user. The historical product transaction data for a product may then be analyzed to determine a number of sales of the product that occurred after the user performed the indicating activity. An indicator score may be calculated for one or more users, the indicator score based on the number of sales of a product after the user's indicating activity. In some cases, an indicator score for a user may be determined based on a range of products of a particular type, such as eBooks or video games generally. Alternatively, indicator scores may be determined for a particular category, sub-category, class, or genre of products, such as science fiction eBooks or fantasy role playing video games. Implementations support the determination of indicator scores with respect to any type of product, over a range of products having any breadth or degree of specificity.

The subsequent activities of one or more of the scored users may then be monitored to predict the diffusion (e.g., sales trends) of products. In some implementations, the user activity data for one or more users may be analyzed to identify activities demonstrating that one or more users have an interest in, or an opinion of, a product. Such indicating activities may include purchases of the product, published reviews or recommendations of the product, online searches for the product, views of a web page or other information describing the product, and so forth. Based on the distribution of the previously calculated indicator scores for the one or more users who have performed indicating activities with regard to a product, a diffusion model may be developed that projects the future sales, usage, or diffusion of the product among a population of users or customers. The diffusion model may then be employed to make predictions regarding the future sales of the product, or other types of future transactions involving the product. Such predictions may be used by members of a business organization to estimate future revenues or losses, make decisions regarding investments in advertising or marketing particular products, make decisions regarding staffing or equipment acquisitions, make decisions whether to acquire rights to particular products, and so forth. The predictions may also be provided to parties outside an organization, for use in marketing, sales, or other activities.

Although examples herein describe the modeling of future sales of eBooks, implementations are not limited to any particular type of product or any particular type of transaction involving that product. Implementations support the modeling of the future transactions (e.g., sales), use, or popularity of any type of product, including but not limited to one or more of the following:

Print media products in a digital or a non-digital format, such as books (eBooks or print books), magazines, journals, pamphlets, and so forth;

Other types of media products, such as video content, audio content (e.g., music or spoken word recordings), audio-visual content (e.g., films or television), games (e.g., video games, card games, or board games), digital information products generally, or other types of media products;

Any other type of tangible products, such as clothing, electronics, vehicles, real estate, furniture, appliances, household goods, consumables (e.g., food, drink, or pharmaceutical items), and so forth; or Services of any type, such as cleaning services, repair services, professional services, personal services, travel services, financial services, dining or entertainment services, and so forth.

Moreover, although the examples herein describe the modeling of the diffusion of products in commerce, implementations are not limited to products that are bought, sold, rented, leased, and so forth. Implementations may be employed to model the future diffusion of items within a population of individuals who obtain and use the items substantially for free, such as borrowed items, trial items, demo items, public domain or publicly licensed items, or items that disseminate by virtue of having a substantially low or zero marginal cost of manufacture.

FIG. 1 depicts an environment 100 for determining indicator scores and predicting future product transactions or future product diffusion (e.g., spread or usage) based at least partly on the indicator scores and on one or more observed activities of the user(s). The environment 100 may include one or more analysis server devices 102. The analysis server device(s) 102 may comprise any type of computing device, including but not limited to a server computer, a personal computer, a network computer, a cloud computing or distributed computing device, a smartphone, a tablet computer, a wearable computer, an implanted computer, a mobile gaming device, an electronic book reader, an automotive computer, a desktop computer, a laptop computer, a thin client, a terminal, a game console, a smart appliance, a home entertainment device, and so forth. An example of the analysis server device(s) 102 is described further with reference to FIG. 4. In some cases, two or more of the analysis server devices 102 may comprise a cluster, cloud, farm, or other grouping of multiple devices that coordinate operations to provide load balancing, failover support, parallel processing capabilities, shared storage capacity, or other aspects.

In some implementations, the analysis server device(s) 102 may communicate over one or more networks with one or more of a transaction data storage 104, a user activity data storage 106, or a product data storage 108. The transaction data storage 104, the user activity data storage 106, and the product data storage 108 may each comprise any number of data storage systems that employ any type of data storage technology, including relational databases, non-relational databases, or both relational and non-relational databases. Although the transaction data storage 104, the user activity data storage 106, and the product data storage 108 are depicted in FIG. 1 as external to the analysis server device(s) 102, implementations are not so limited. In some implementations, one or more of the transaction data storage 104, the user activity data storage 106, or the product data storage 108 may be at least partly included as local storage on the analysis server device(s) 102. Moreover, although the transaction data storage 104, the user activity data storage 106, and the product data storage 108 are depicted in FIG. 1 as separate data storage systems or devices, in some implementations one or more of the transaction data storage 104, the user activity data storage 106, or the product data storage 108 may be at least partly incorporated into one or more common data storage systems.

Figure 2:
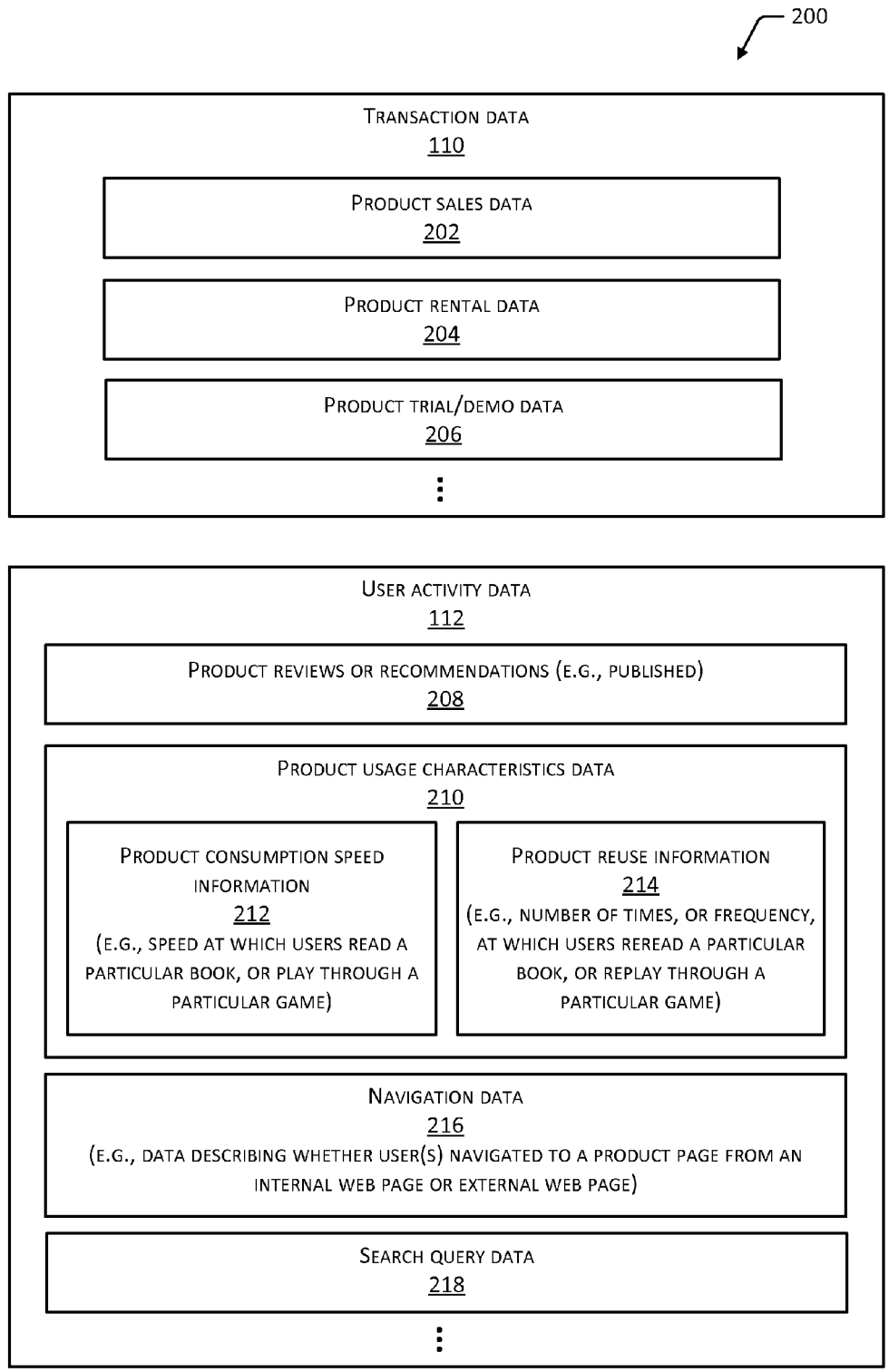
FIG. 2 depicts a schematic of example transaction data and example user activity data that may be employed to determine indicator scores.

The transaction data storage 104 may store transaction data 110 that comprises one or more data records describing any type of transaction involving one or more products. The user activity data storage 106 may store user activity data 112 that comprises one or more data records describing any type of user activities such as online activities on one or more web sites. FIG. 2 depicts a schematic 200 of an example of the transaction data 110 and an example of the user activity data 112 that may be employed to determine indicator scores and develop diffusion models.

As shown in the example of FIG. 2, the transaction data 110 may include data records that describe any type of transaction involving any type of product. In some cases, the transaction data 110 includes one or more data records of product sales data 202, each such data record describing a sale of a product to a customer. The transaction data 110 may also include data records that describe transactions other than sales. For example, the transaction data 110 may include one or more data records of product rental data 204, describing rentals, leases, or licenses of products by one or more customers. The transaction data 110 may include one or more data records of product trial/demo data 206, describing trials, demos, borrowings, or other types of transactions in which a customer may use a product substantially free of charge. Implementations are not limited to the types of transactions illustrated in FIG. 2. For example, the transaction data 110 may also describe gift transactions of a product from one party to another. The customer(s) described in the various types of the transaction data 110 may include individuals, groups of individuals, businesses, organizations, or other entities. Each of the data records included in the various types of transaction data 110 may include an identification of the customer(s) that were parties to the transaction, an identification of the product(s) involved in the transaction (e.g., product(s) purchased, rented, or borrowed), an amount paid in the transaction, a date and time of the transaction, a location of the transaction (e.g., a physical location or a web site address), information describing any payment instrument used in the transaction, information indicating whether the product was subject to a discount, promotion, rebate, or other special terms, or other information.

As shown in the example of FIG. 2, the user activity data 112 may include data records that describe any type of user activity exhibited by or performed by a user. In some cases, the user activity data 112 may describe online activities of one or more users interacting with web sites, networked applications, or communications networks. In some cases, the user activity data 112 may include product reviews or recommendations 208, or at least a portion thereof. The product reviews or recommendations 208 may be published reviews or recommendations written by users and presented through a public or semi-public online forum. For example, the product reviews or recommendations 208 may include reviews, recommendations, comments or other any information published on blogs, product review web sites, e-commerce web sites, social networking sites, newspapers, magazines, journals, or web sites that provide commentary regarding various types of media such as books, games, music, films, movies, and so forth. The data records describing the product reviews or recommendations 208 may include an identification of the user who wrote the review or recommendation, a date and time when the review or recommendation was written or published, an identification of the product that is the subject of the review or recommendation, a location where the review or recommendation was published, a product rating (e.g., number of stars), a number of ratings or reviews, an average rating, information regarding distribution of ratings, and so forth. In some cases, data records describing the product reviews or recommendations 208 may include an indication of whether the review or recommendation was a substantially positive, negative, or neutral review or recommendation of the product. In some cases, the product reviews or recommendations 208 may be collected by a process that analyzes various web sites, identifies relevant, published reviews or recommendations by users, and stores at least a portion of the reviews or recommendations along with information describing the user, the product, the date and time of the publication, and so forth.

In some cases where the consumed product is a creative work such as a book, song, film, and so forth, the user activity data 112 may include information collected from a social network page or other web page associated with one or more creators of the work, such as an author of a book or a performer of a song. For example, the user activity data 112 may include a number of followers on a social network site associated with a creator of the product.

The user activity data 112 may also include product usage characteristics data 210 describing one or more characteristics of how a user consumes a product. In some implementations, the product usage characteristics data 210 may include product consumption speed information 212 describing how long it takes a user to use or consume a product. For example, data records included in the product consumption speed information 212 may include a description of how much time was spent by a user to read a particular eBook or to play through a particular game. The product usage characteristics data 210 may also include product reuse information 214, describing a number of times that a user has consumed a particular product or a frequency at which the user reconsumes a particular product. For example, data records included in the product reuse information 214 may include a description of how many times a user has read a particular eBook, played a particular game, watched a particular film, listened to a particular song, and so forth. The data records may also describe the frequency (e.g., number of reuses divided by a time period) at which the user has performed these activities.

In cases where the consumed product is a book (e.g., an eBook), the product usage characteristics data 210 may also include information regarding user consumption of one or more particular sections of the book that have a particular character or that may exhibit particular thematic elements. For example, the product usage characteristics data 210 may indicate a manner (e.g., a speed) in which a user consumes a suspenseful, romantic, or expository section of the book. The product usage characteristic data 210 may also include information describing bookmarks, annotations, or highlights that a user makes in an electronic version of a book. In some cases, the product usage characteristic data 210 may include information regarding sections of a book that the user has shared with other users, for example via a social network.

The various types of the product usage characteristics data 210 may include an identification of the user, an identification of the product consumed, date and time information for when the product was consumed, the type of device on which the product was consumed, and so forth. In some cases, the product usage characteristics data 210 may be collected from one or more computing devices employed by users to consume the products, such as eBook reader devices, smartphones, tablet computers, personal computers, and so forth.

In some implementations, the user activity data 112 may include navigation data 216 that describes a manner in which a user navigated to a product web page to purchase, borrow, rent, or otherwise acquire a product. In some cases, the navigation data 216 may include, or may be based on, clickstream data collected by one or more server devices that provide one or more web sites to which users navigate. For example, the navigation data 216 may include an indication that a user acquired a product from a product description web page, after navigating to the product description web page from some other web page. The navigation data 216 may indicate that the user navigated to the product description web page from an internal web page included in a same web site as the product description web page. Such navigation history may indicate that the user came across the product description web page while generally browsing for various products through the web site. Alternatively, the navigation data 216 may indicate that the user navigated to the product description web page from an external site, such as by following an external link from a search results page, a blog posting, a product review, and so forth. Such navigation history may indicate that the user deliberately chose a specific product description web page to view.

In some implementations, the user activity data 112 may include search query data 218 that describes one or more searches made by users for products. The data records that comprise the search query data 218 may include an identification of the user who requested the search, at least a portion of the search query provided by the user, an identification of the product searched for, a date and time of the search, and so forth. The search query data 218 may be collected by one or more web sites that provide search functionality. Although FIG. 2 lists various types of data that may be included in the transaction data 110 and the user activity data 112, implementations are not limited to these examples.

Implementations may ensure that information regarding users and their activities remains private. In some cases, users may be asked for their permission whether the user activity data 112 associated with their online activities may be collected, stored, and analyzed as described herein. In some cases, this permission may be in the form of an opt-in query, in which the user activity data 112 for a user is collected, stored, and analyzed after that user explicitly gives permission for such actions. In some implementations, the transaction data 110 and the user activity data 112 is collected through one or more web sites that are operated by an organization (e.g., a business) and processed internally within that organization, such that the collected data is not communicated to or stored on devices that are not operated by the organization. In some implementations, to ensure data privacy the processing of the data may be performed at least partly on aggregations of the data which do not include information identifying particular users or particular transactions. In some cases, the information identifying particular users or particular transactions may be secured through encryption, obfuscation, or through other security measures to prevent unauthorized access to the information.

With reference to FIG. 1, the product data storage 108 may store product data 114. The one or more data records of the product data 114 may each describe a product that is offered for sale, rental, trial, or some other type of acquisition by one or more users. Accordingly, the data records of the product data 114 may include an identification number that identifies the product, a manufacturer or provider of the product, a title or description of the product, a price of the product, information regarding availability of the product (e.g., whether it is in stock), and so forth. The product data 114 may also indicate a type, category, sub-category, genre, or class of the products identified in the product data 114.

In some implementations, the analysis server device(s) 102 may execute an indicator score determination module 116. The indicator score determination module 116 may access data records of the transaction data 110 and the user activity data 112. In some implementations, the indicator score determination module 116 may also access the product data 114 (e.g., to determine genre, category, sub-category, type, or class information for the various products). Based on the accessed data, the indicator score determination module 116 may calculate or otherwise determine indicator scores for one or more users by performing operations as described further with reference to FIGS. 5 and 6. In some cases, the indicator score for a user may be higher if the user has performed activities that indicate a substantially positive opinion of a product that is later demonstrated to be a successful product, a bestselling product, or a popular product. Alternatively, the indicator score for a user may be higher if the user has performed activities that indicate a substantially negative opinion of a product that is later demonstrated to be unsuccessful. Accordingly, a user's indicator score may provide an indication of a predictive characteristic of the user with respect to the product. The indicator score may also provide a measure of the extent to which that user may be a predictor of future product diffusion with respect to other products. Users with higher indicator scores (e.g., higher than the scores of other users) may be described as taste leaders, mavens, fashion forward users, users who are ahead of the pack, and so forth.

Indicator scores for a plurality of users (e.g., for a cohort of users) may be included in indicator score data 118. The indicator score data 118 may identify one or more users based on given names, usernames, user addresses, unique user identification numbers, or other types of identifiers, and may list an indicator score for each of the identified users. To ensure user privacy, the indicator score data 118 may identify user(s) using an assigned identifier that may not be readily relatable to other identifying information for the user(s). The indicator score data 118 may be securely stored locally on the analysis server device(s) 102 or elsewhere, and may be employed by other modules executing on the analysis server device(s) 102.

In some implementations, the analysis server device(s) 102 may execute a diffusion model generation module 120. The diffusion model generation module 120 may receive an identification of a particular product to be modeled, as described in the product data 114(1). The diffusion model generation module 120 may access the indicator score data 118 and the user activity data 112 associated with one or more users. In some cases, the diffusion model generation module 120 may also access the transaction data 110 for the product to be modeled, if any transactions have occurred that involve the product to be modeled. Based at least partly on the indicator score data 118, the user activity data 112, and in some cases the transaction data 110, the diffusion model generation module 120 may generate diffusion model data 122 that describes one or more diffusion models that predict the future diffusion of one or more products. In some cases, the modeled products may be new or emerging products that are recently released or that are otherwise early in their life cycle. Operations of the diffusion model generation module 120 are described further with reference to FIGS. 7 and 8.

Figure 3:
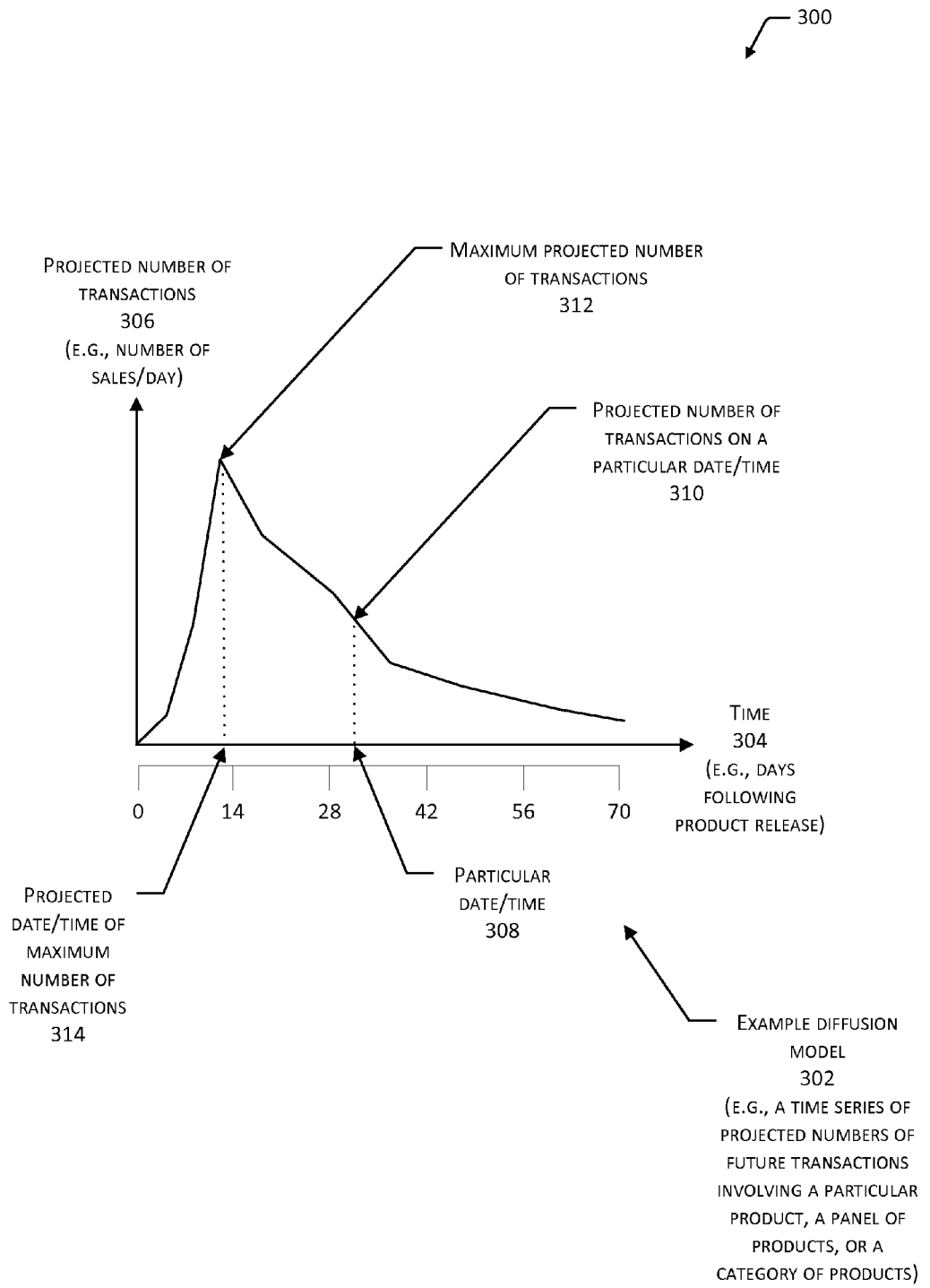
FIG. 3 depicts a schematic of an example model (e.g., a diffusion model) that describes a time series of projected numbers of future transactions involving a product.

In some implementations, the diffusion model for a product is a time series of projected numbers of future transactions involving the product, such as future numbers of sales, uses, downloads, and so forth. FIG. 3 depicts a schematic 300 of an example diffusion model 302. In some implementations, a diffusion model may be generated that predicts future transactions involving a single product. Alternatively, a diffusion model may be generated that predicts future transactions for a plurality of products that may be described as a panel of products. In some cases, a diffusion model may be generated that predicts future transactions for a plurality of products that are related within a same category, class, type, or genre of products. For example, a diffusion model may be generated that projects future sales of eBooks that are within the romance genre of eBooks.

In the example of FIG. 3, the example diffusion model 302 is depicted as a two-dimensional graph with time 304 on the horizontal axis and projected number of transactions 306 on the vertical axis. The time 304 axis may depict all, or a portion of the life cycle of a product, e.g., a period of time during which the product is commercially available for purchase or is otherwise available for acquisition by users or customers. The plotted example diffusion model 302 is a time series of points in which each point indicates the number of transactions that is projected to occur at a particular future instant described by a date/time (e.g., a date, a time, or both a date and a time). The time series for the diffusion model may also be described as a series of ordered pairs of data, in which each pair includes a first value that is a future date/time and a second value that is the projected number of transactions on that future date/time. The projected number of transactions may be the number of transactions per period of time, such as number of transactions per day.

Based on the generated diffusion model, various predictions may be made regarding the future of one or more products described by the diffusion model. For example, for a particular date/time 308 in the future the diffusion model may indicate a number of transactions 310 that are projected to occur on that date/time 308. As another example, the diffusion model may exhibit a peak that corresponds to a maximum projected number of transactions 312 over the period when the product is commercially available. The diffusion model may provide a projected date/time of maximum number of transactions 314 as the date/time when the maximum number of transactions 312 is projected to occur. Additionally, the diffusion model may enable other predictions to be made, such as a predicted total number of sales of the product over a period of time, a predicted total revenue from the sales of the product over a period of time, a predicted number of copies of the product that may be used by users over a period of time, and so forth.

Although the example of FIG. 3 depicts an example diffusion model 302 as a two-dimensional graph of a time series, implementations are not limited by this example. In some implementations, the diffusion model may include projection data in more than two dimensions, such as a time series in which a particular time is correlated with more than two values. Accordingly, the diffusion model may be presented generally as an n-dimensional surface where n is 2 or greater. Moreover, although examples herein may describe a diffusion model that describes a number of product sales over time, the diffusion model may describe any aspect of product behavior over time. For example, a diffusion model may project a number of sales, rentals, trials, uses, or other user acquisitions of one or more products over time. The diffusion model may also project the diffusion of one or more products as the number of persons who acquire the product(s), the number of households or families that acquire the product(s), the number of businesses, organizations, or other entities that acquire the product(s), the number of streets, neighborhoods, cities, or other geographic designations in which the product(s) are present, and so forth. Generation of the diffusion model for one or more products is described further with reference to FIG. 7.

With reference to FIG. 1, the diffusion model data 122 describing one or more diffusion models may be accessed by a prediction module 124 executing on the analysis server device(s) 102. The prediction module 124 may employ the one or more diffusion models to generate one or more predictions regarding future transactions involving one or more products. Such prediction(s) may include, but are not limited to, those predictions described above with reference to FIG. 3. The prediction(s) may be output as prediction data 126. The prediction data 126 may be employed by employees or owners of a business, by members of some other type of organization, or by automated processes to make decisions regarding the operations of the business or organization. By analyzing the activities of users with respect to a product, in view of the indicator scores of the users, implementations may enable predictions, projections, or forecasting of the future sales performance or diffusion of the product.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), mobile communications networks (e.g. 3G, 4G, etc.), and so forth. In some implementations, communications between the various devices in the environment 100 may be encrypted or otherwise secured. For example, such communications may employ one or more public or private cryptographic keys, digital certificates, or other credentials supported by a security protocol such as any version of the Secure Socket Layer (SSL) or the Transport Layer Security (TLS) protocol.

Figure 4:
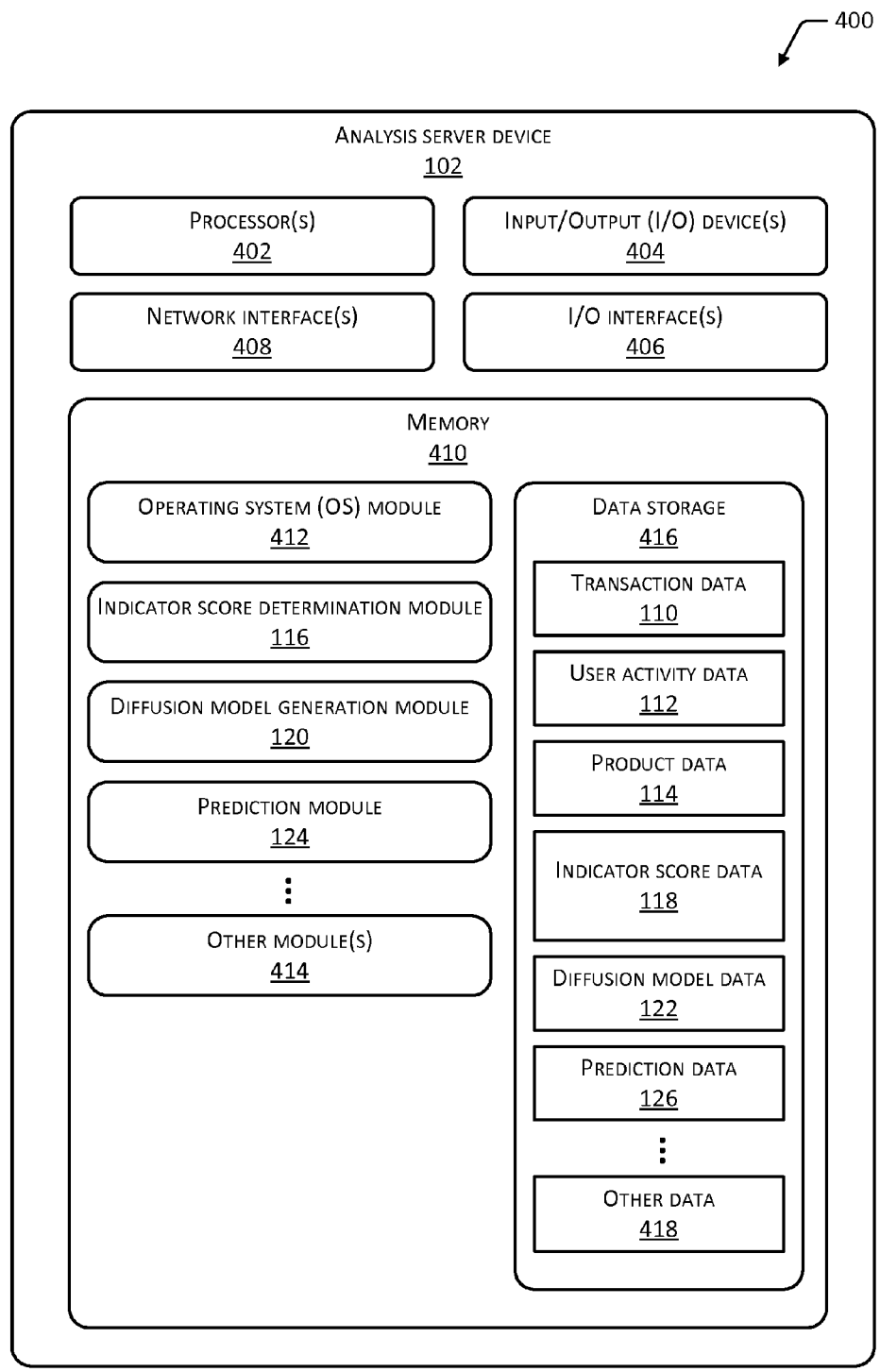
FIG. 4 depicts a block diagram of an example analysis server device that may be employed to determine indicator scores for a plurality of users and to predict future product transactions based on the indicator scores and on the observed activities of the users.

FIG. 4 depicts a block diagram 400 of an example of the analysis server device(s) 102. As shown in the block diagram 400, the analysis server device 102 may include one or more processors 402 configured to execute one or more stored instructions. The processor(s) 402 may comprise one or more cores.

The analysis server device 102 may include one or more input/output (I/O) devices 404. The I/O device(s) 404 may include input devices such as a keyboard, a mouse, a pen, a game controller, a touch input device, an audio input device (e.g., a microphone), a gestural input device, a haptic input device, an image or video capture device (e.g., a camera), or other devices. In some cases, the I/O device(s) 404 may also include output devices such as a display, an audio output device (e.g., a speaker), a printer, a haptic output device, and so forth. The I/O device(s) 404 may be physically incorporated with the analysis server device 102, or may be externally placed.

The analysis server device 102 may include one or more I/O interfaces 406 to enable components or modules of the analysis server device 102 to control, interface with, or otherwise communicate with the I/O device(s) 404. The I/O interface(s) 406 may enable information to be transferred in or out of the analysis server device 102, or between components of the analysis server device 102, through serial communication, parallel communication, or other types of communication. For example, the I/O interface(s) 406 may comply with a version of the RS-232 standard for serial ports, or with a version of the IEEE 1284 standard for parallel ports. As another example, the I/O interface(s) 406 may be configured to provide a connection over Universal Serial Bus (USB) or Ethernet. In some cases, the I/O interface(s) 406 may be configured to provide a serial connection that is compliant with a version of the IEEE 1394 standard. The analysis server device 102 may also include one or more busses or other internal communications hardware or software that allow for the transfer of data between the various modules and components of the analysis server device 102.

The analysis server device 102 may include one or more network interfaces 408 that enable communications between the analysis server device 102 and other networked devices, such as the transaction data storage 104, the user activity data storage 106, and the product data storage 108. The network interface(s) 408 may include one or more network interface controllers (NICs) or other types of transceiver devices configured to send and receive communications over a network.

The analysis server device 102 may include one or more memories, described herein as memory 410. The memory 410 comprises one or more computer-readable storage media (CRSM). The CRSM may include one or more of an electronic storage medium, a magnetic storage medium, an optical storage medium, a quantum storage medium, a mechanical computer storage medium, and so forth. The memory 410 provides storage of computer-readable instructions that may describe data structures, program modules, processes, applications, or other data for the operation of the analysis server device 102.

The memory 410 may include an operating system (OS) module 412. The OS module 412 may be configured to manage hardware resources such as the I/O device(s) 404, the I/O interface(s) 406, and the network interface(s) 408, and to provide various services to applications, processes, or modules executing on the processor(s) 402. The OS module 412 may include one or more of the following: any version of the Linux® operating system originally released by Linus Torvalds; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

The memory 410 may include one or more of the modules described above as executing on the analysis server device(s) 102, such as the indicator score determination module 116, the diffusion model generation module 120, and the prediction module 124. The memory 410 may also include one or more other modules 414, such as a user authentication module or an access control module to secure access to the analysis server device 102, and so forth.

The memory 410 may include data storage 416 to store data for operations of the analysis server device 102. The data storage 416 may comprise a database, array, structured list, tree, or other data structure, and may be a relational or a non-relational datastore. The data storage 416 may store data such as that described above with reference to FIGS. 1-3, including one or more of the transaction data 110, the user activity data 112, the product data 114, the indicator score data 118, the diffusion model data 122, or the prediction data 126. The data storage 416 may also store other data 418, such as user authentication information or access control data. In some implementations, at least a portion of the information stored in the data storage 416 may be stored externally to the analysis server device 102, on other devices that may communicate with the analysis server device 102 via the I/O interface(s) 406 or via the network interface(s) 408.

Figure 5:
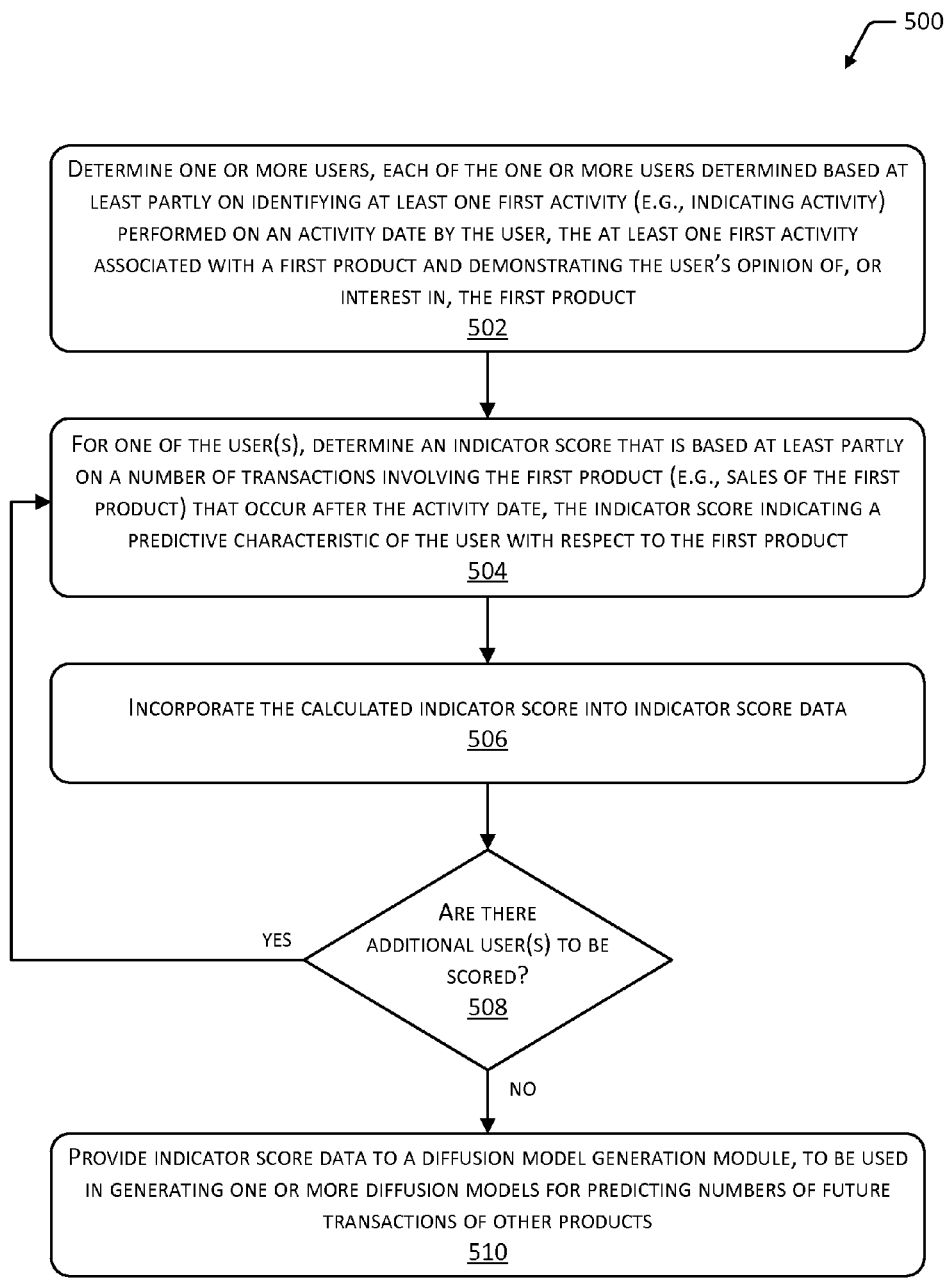
FIG. 5 depicts a flow diagram of a process for determining indicator scores based on user activity involving a product, and based on subsequent transactions involving the product.

FIG. 5 depicts a flow diagram 500 of a process for determining indicator scores for one or more users based at least partly on the activities of the one or more users with respect to a product. One or more operations of the process may be performed by the indicator score determination module 116, other modules of the analysis server device(s) 102, or other modules of other devices.

At 502, one or more users are selected or otherwise determined from a plurality of users. In some cases, the plurality of users may include customers of one or more online businesses (e.g., e-commerce web sites) or brick-and-mortar businesses. In some implementations, the one or more users may be determined based on the user(s) having performed one or more activities related to a first product. The determination of the activities may be based on analyzing the user activity data 112, which describes the activity performed, the user who performed the activity, and a date/time when the activity was performed by the user. For example, one or more users may have purchased the first product, written a published review or recommendation of the first product, or performed other activities described in the user activity data 112. Such activities may demonstrate a user's interest in the product or opinion of the product, and may be described as indicative activities. Each indicative activity may have been performed on a particular date or time by the user, as described in the user activity data 112. The date when an activity was performed may be described as the activity date. The identifying of indicative activities of one or more users is described further with reference to FIG. 6.

In some implementations, the determination of the user(s) at 502 and the calculation of indicator scores for the user(s) may be based on a combined dataset that includes data from one or more of the transaction data 110, the user activity data 112, and the product data 114. Such a combined dataset may include one or more observations, each observation describing the sale (or other type of transaction) of a product. Each observation may describe the product, the customer, the date/time of the transaction, the number of units of the product sold, the price, and other information. The observation may be augmented with the following information:

- Reviews or recommendation data, including a total number of reviews of the product, total number of ratings of the product (e.g., number of stars in a star-based rating system), the distribution of the ratings (e.g., how many of the ratings are in the 10th percentile, in the 20th percentile, and so forth), average ratings of recent reviews, the proportion of units that are reviewed, and so forth;
- Product (e.g., title) characteristics data, including (e.g., in cases where the product is an eBook) the author, length, category, subcategory, genre, browse node (e.g., address of a product page), keywords, language, royalty structure for payments to the author, and so forth;
- Consumption (e.g., book reading) behavior data, including the proportion of total units sold that have been finished or completed by users, the distribution (e.g., among readers or other users) of the time spent consuming (e.g., reading) the product, and so forth;
- Product (e.g., title) pricing history data, including whether the product has been subject to any promotions, discounts, sales, rebates, and so forth; or
- Search data, including a number of product page views (e.g., glanceviews), a number of searches for the product, or other types of clickstream data.

With the possible exception of the product (e.g., title) characteristics data, one or more of these types of data may be measured at the date/time of the particular transaction included in the observation. For example, if a customer purchased a particular book on Jan. 6, 2013, the data included in the observation corresponding to that transaction may include the total number of reviews as of that date, an indication of whether the book had been subject to any promotions or discounts on that date or prior to that date, and so forth. In some implementations, the combined dataset of observation data may be further employed in generating the diffusion model, as described further with reference to FIG. 8.

At 504, for one of the users identified at 502, an indicator score may be determined based at least partly on the transaction data 110 describing one or more transactions involving the first product. In some implementations, the indicator score may be based at least partly on a number of transactions involving the first product that occurred after the activity date of the indicating activity performed by the user. For example, the indicator score may be calculated based on the number of sales of the first product that occurred after the activity date and before a current date/time when the calculation is performed. In some implementations, the indicator score is the total number of such transactions (e.g., sales) that occurred between the activity date and the current date/time. In some implementations, the indicator score may be calculated based on a fixed effects model, such that the indicator score for each user is based at least partly on whether the user demonstrates indicative activities toward products that go on to be high selling, widely consumed, or otherwise successful products. As described above, the indicator score may indicate a predictive characteristic of the user with respect to the first product, and with respect to other products.

At 506, the indicator score is incorporated into the indicator score data 118. In some cases, the indicator score data 118 may include a plurality of indicator scores calculated for a plurality of users based on a variety of different products. In some cases, the indicator score data 118 may store indicator scores with respect to one or more particular products, or with respect to products within one or more of a particular category, sub-category, type, class, or genre.

Accordingly, a particular user may be associated with a single indicator score or with a plurality of indicator scores. For example, a user may be associated with indicator scores for different genres, categories, or types of products. Moreover, in cases where the products include books, a user may be associated with a plurality of indicator scores related to different types of content with a book. For example, a user may have a first indicator score related to the user's behavior with respect to suspenseful sections of books, and a second indicator score related to behavior with respect to romantic sections of books.

At 508, a determination is made whether there are additional users to be scored, e.g., additional users of the one or more users determined at 502. If so, the process may return to 504 and determine an indicator score for another user. If not, the process may proceed to 510.

At 510, indicator score data may be provided to the diffusion model generation module 120. Alternatively, the indicator score data 118 may be stored on the analysis server device(s) 102 and made available for future access by the diffusion model generation module 120. The diffusion model generation module 120 may employ the indicator score data 118 to generate one or more diffusion models for products, as described further with reference to FIGS. 7 and 8.

In some implementations, users having an indicator score above a predetermined threshold score may be identified as indicator users. In some cases, the threshold score may be based at least partly on a type, category, or genre of the first product. For example, the threshold score for a first product that is a young adult fiction eBook may be higher than the threshold score for a first product that is a technical manual for repairing a Wankel engine, given that young adult fiction genre titles may exhibit a different baseline of popularity than technical manual genre titles. For example, a user that exhibits an above-threshold indicator score with respect to a product in a particular genre may be designated as an indicator user (e.g., a maven) with respect to other products (e.g., other books) within that genre.

Figure 6:
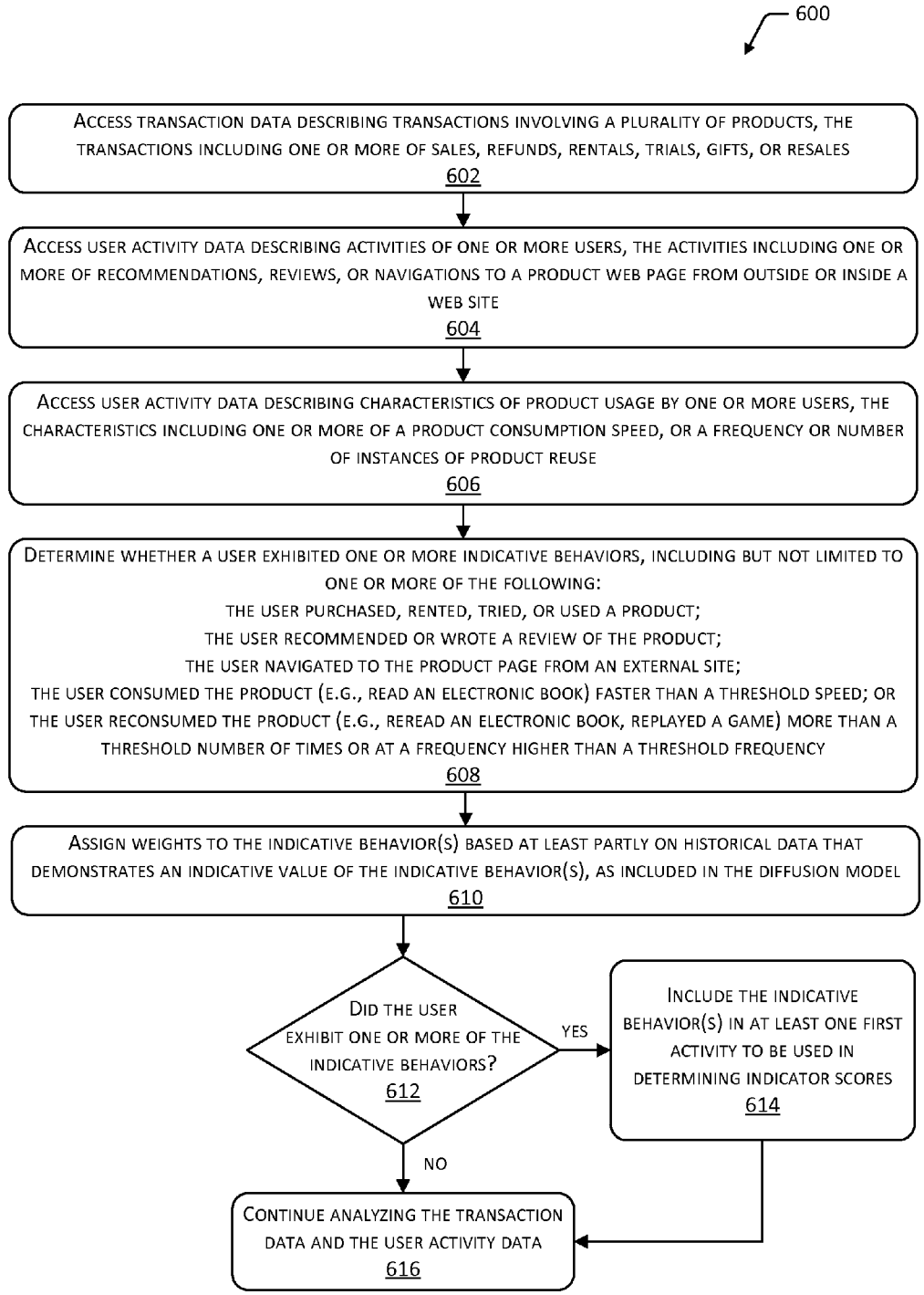
FIG. 6 depicts a flow diagram of a process for analyzing user activities to identify users for whom to calculate indicator scores.

FIG. 6 depicts a flow diagram 600 of a process for analyzing user activities to identify users for whom to calculate indicator scores. One or more operations of the process may be performed by the indicator score determination module 116, other modules of the analysis server device(s) 102, or other modules of other devices.

At 602, the transaction data 110 may be accessed. As described above with reference to FIG. 2, the transaction data 110 may describe one or more transactions involving one or more products, where the transaction(s) may include sales, rentals, trials, demos, refunds, resales, gifts, and so forth.

At 604, the user activity data 112 may be accessed. As described above with reference to FIG. 2, the accessed user activity data 112 may describe one or more activities of one or more users, such as the writing and publication of product reviews or recommendations, or navigations by users to product web pages that offer one or more products for acquisition by users.

At 606, in some implementations the user activity data 112 may be further accessed to retrieve product usage characteristics data 210. As described above with reference to FIG. 2, such data may include the product consumption speed information 212 and the product reuse information 214.

At 608, a determination is made whether a user exhibited one or more indicative behaviors, where such behaviors indicate an opinion of the user toward a product, or an interest of the user in the product. The indicative behaviors may include, but are not limited to, one or more of the following:

- As described in the transaction data 110, the user purchased, rented, tried, or otherwise used or acquired a product;
- As described in the user activity data 112, the user wrote and published a review or recommendation of the product, the review or recommendation being substantially positive, negative, neutral, or otherwise indicating an opinion;
- As described in the user activity data 112, the user navigated to a product page describing the product, from an external web site that is external to a web site (e.g., an e-commerce site) that provides the product page, providing an indication that the user may have sought out information regarding the product instead of coming across the product page while browsing through multiple product pages;
- As described in the user activity data 112, the user consumed the product (e.g., read an eBook) faster than a threshold speed, providing an indication that the user may have been enthusiastic about consuming the product; or
- As described in the user activity data 112, the user reconsumed the product (e.g., reread an eBook, replayed a game, rewatched a video, or replayed a song) more than a threshold number of times or at a frequency higher than a threshold frequency, providing an indication that the user may have been enthusiastic about consuming the product.

At 610, in some implementations one or more weights may be assigned to the one or more indicative behaviors based at least partly on historical data that demonstrates an indicative value of the indicative behavior(s). For example, historical data such as user behavior data and transaction data may indicate that the borrowing of a book may be a more reliable indicator of a user's interest in a book than other types of behavior. In some implementations, such weighting may be incorporated into the diffusion model and the model itself may be employed to assign weights to various indicative behaviors.

At 612, a determination is made whether the user exhibited one or more of the indicative behaviors determined at 608. If so, the process may proceed to 614. Otherwise, the process may proceed to 616.

At 614, the one or more indicative behaviors determined at 608 may be included in the one or more activities (e.g., the first activities described with reference to 502) to be employed in the process for determining the indicator score for one or more users, as described above with reference to FIG. 5. In some implementations, the determination of activities to employ may be further based on the weights assigned at 610. The process may then proceed to 616.

At 616, the process may continue analyzing the transaction data 110 and the user activity data 112 to determine one or more indicative activities performed by user(s).

Figure 7:
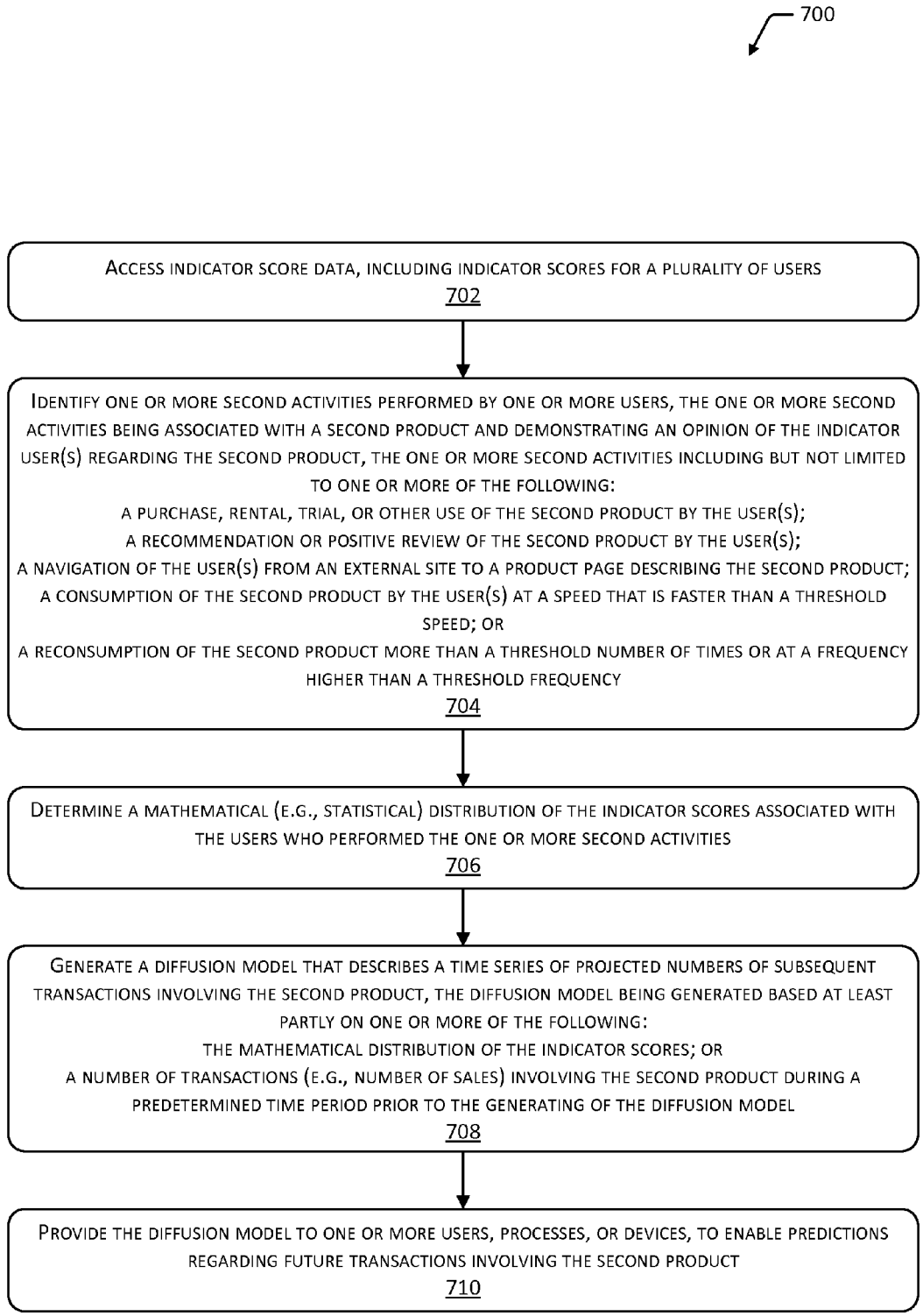
FIG. 7 depicts a flow diagram of a process for analyzing the observed activities of users with respect to a product, and employing the indicator scores of the users to develop a model that predicts the number of future transactions involving the product.

FIG. 7 depicts a flow diagram 700 of a process for analyzing the observed behaviors of users with respect to a product to develop a model that predicts the number of future transactions involving the product. One or more operations of the process may be performed by the diffusion model generation module 120, other modules of the analysis server device(s) 102, or other modules of other devices.

At 702, the indicator score data 118 is accessed. Such data may provide an indicator score for one or more users, determined as described with reference to FIGS. 5 and 6.

At 704, one or more activities of one or more users may be identified based on the transaction data 110, the user activity data 112, or both. The one or more activities of the user(s) may be associated with a particular second product. In some cases, the one or more activities may demonstrate an interest or an opinion of the user(s) toward the second product, and the opinion may be substantially negative, substantially positive, or otherwise. In some cases, the second product may be a new or emerging product such that the activities of the user(s) with regard to the second product demonstrate that the user(s) may be early adopters, fans, or proponents regarding the second product. The second product may be an eBook or other product for which an analysis is to be performed to determine whether to acquire publication rights. The indicative activities identified at 704 may include, but are not limited to, any of the activities described above with reference to 608.

At 706, the indicator scores of the user(s) identified at 704 may be combined or otherwise processed to determine a distribution of indicator scores. In some implementations, the distribution may be a set of data that describes a number of indicator scores at multiple values within a range of indicator scores. As such, the distribution may describe a frequency of occurrence of indicator scores at multiple values within the range of indicator scores. In some cases, the distribution is a mathematical or statistical distribution describing a number of indicator scores in each of a plurality of bins, sub-ranges, or buckets within the range of indicator scores. For example, the distribution may indicate a first number of indicator scores in a first segment of the range of scores (e.g., in a range from 0 to 10% of the maximum score), a second number of indicator scores in a second segment (e.g., in a range from 10% to 20% of the maximum score), and so forth.

At 708, a diffusion model may be generated that projects numbers of future transactions involving the second product. As described above with reference to FIG. 3, the diffusion model may be a time series of projected numbers of transactions at a plurality of future date/time instances. In some implementations, the diffusion model may be at least partly based on the Bass Diffusion Model originally developed by Frank Bass. Such a model may describe a process by which products diffuse among, or are adopted by, individuals in a population.

In some implementations, generating the diffusion model may be based at least partly on the combined dataset of multiple observations, as described above with reference to FIG. 5. In some cases, the combined dataset may be aggregated or otherwise processed so that each observation describes information for a particular product on a particular date. For each product, a calculation may be made of the sum of the sales or other transactions involving the product on each day. A panel data model may be estimated using the processed, combined dataset in conjunction with the indicator score distribution determined at 706 to describe the number of future units of each product sold at each date/time. This model may be over various time periods, such as a 30 day, 60 day, or 90 day period. In some cases, the diffusion model contains a plurality of time series model elements. For example, for a product at each date/time, a cumulative number of units sold in the past may be incorporated into the diffusion model such that the diffusion model may characterize a particular, current location of the product on the diffusion curve indicated by the diffusion model.

In some implementations the generation of the diffusion model at 708 may be further based at least partly on a number of transactions (e.g., number of sales) involving the second product that have occurred recently during a predetermined period of time prior to the generating of the diffusion model (e.g., in the last week). For example, the rate at which the second product has been selling recently may be incorporated into the diffusion model. In some implementations, products sold for free or on promotion may be modeled differently than products sold at full price.

At 710, the diffusion model may be stored as the diffusion model data 122 and provided to the prediction module 124 or to other modules, processes, users, or devices. The diffusion model for the second product may enable predictions regarding numbers of future transactions involving the second product, or predictions regarding the future performance of the second product in general.

In some implementations, one or more parameter-based estimates may also be incorporated into the diffusion model, estimating how future product sales may be correlated with particular data in the transaction data 110 or the user activity data 112. For example, a parameter-based estimate regarding the total number of published reviews for a product may indicate a correlation between the total number of reviews and the number of product units sold in the 90 days subsequent to the reviews, as indicated in the historical transaction data 110. The diffusion model may be refined or otherwise modified based on such parameter-based estimates. Moreover, in some implementations a separate diffusion model may be generated for different categories, classes, types, or genres of products, and may incorporate different parameter-based estimates for various categories, classes, types, or genres of products. For example, the correlation between the total number of reviews and future unit sales for romance titles may different from the correlation between the total number of reviews and future unit sales for mystery titles, and so forth.

Figure 8:
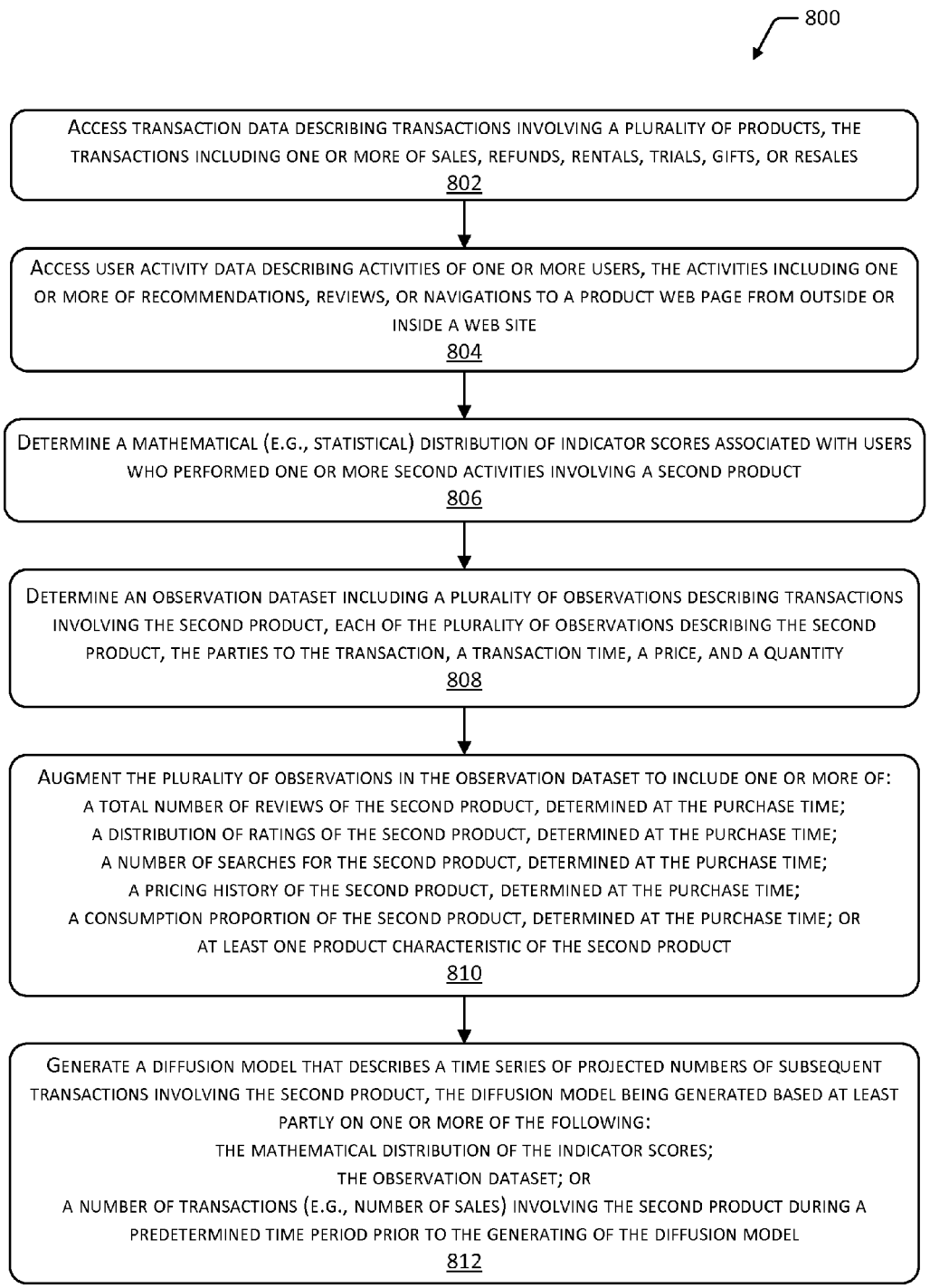
FIG. 8 depicts a flow diagram of a process for generating a model that predicts the number of future transactions involving the product, based at least in part on the indicator scores and an observation dataset.

FIG. 8 depicts a flow diagram 800 of a process for developing a model that predicts the number of future transactions involving the product. One or more operations of the process may be performed by the diffusion model generation module 120, other modules of the analysis server device(s) 102, or other modules of other devices.

At 802, the transaction data 110 may be accessed. As described above with reference to FIG. 2, the transaction data 110 may describe one or more transactions involving one or more products, where the transaction(s) may include sales, rentals, trials, demos, refunds, resales, gifts, and so forth.

At 804, the user activity data 112 may be accessed. As described above with reference to FIG. 2, the accessed user activity data 112 may describe one or more activities of one or more users, such as the writing and publication of product reviews or recommendations, or navigations by users to product web pages that offer one or more products for acquisition by users.

At 806, a determination may be made of a mathematical (e.g., statistical) distribution of indicator scores, as described above with reference to 706.

At 808, an observation dataset may be determined. As described above with reference to FIG. 5, the observation dataset may include a plurality of observations each describing a transaction involving the second product. Each of the plurality of observations may describe the second product, one or more parties to the transaction (e.g., a purchaser), a transaction time, a price, and a quantity of the second product involved in the transaction. The observation dataset may be determined based on the transaction data 110. At 810, the observation dataset may be augmented as described above with reference to FIG. 5, based on the user activity data 112 and the product data 114.

At 812, as described above with reference to 708, a diffusion model may be generated that describes a time series of projected numbers of transactions involving the second product, at a plurality of future date/time instances. In some implementations, the diffusion model may be generated based at least partly on one or more of the following: the distribution determined at 806; the observation dataset determined at 808; or a number of transactions involving the second product during a predetermined time period prior to the generating of the diffusion model. For example, in some cases, the diffusion model may be generated at least in part by combining the distribution of indicator scores with the observation dataset. In some implementations, the diffusion model may be based at least in part on the Bass diffusion model as described above.

Figure 9:
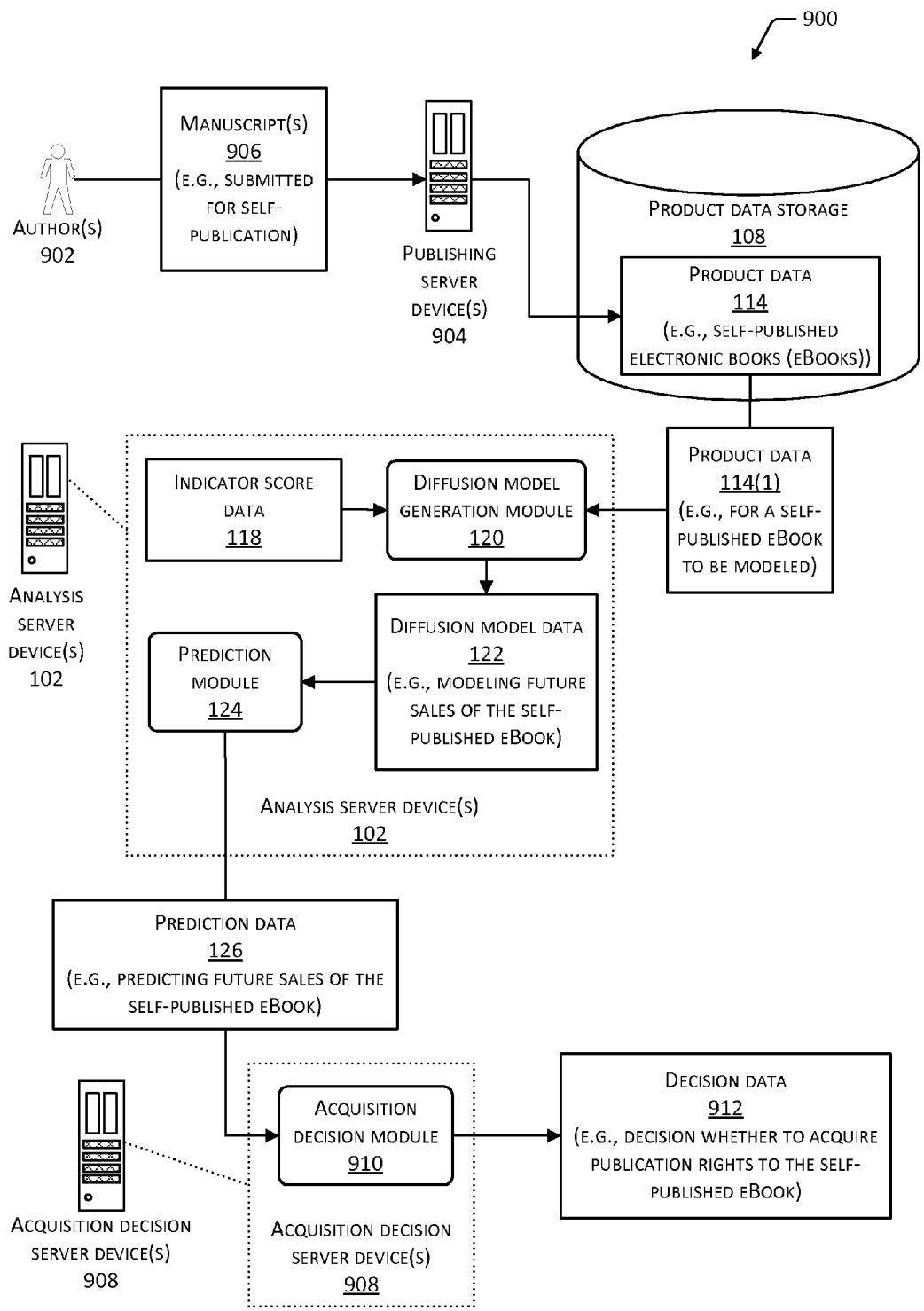
FIG. 9 depicts an environment for determining indicator scores and predicting future product transactions based on the indicator scores and on the observed activities of the users, in implementations where the modeled products include self-published electronic books (eBooks).

FIG. 9 depicts an environment 900 for determining indicator scores for a plurality of users and predicting future product transactions based on the indicator scores and the observed activities of the users. In some implementations, the techniques described herein may be employed in business decisions whether to acquire publication rights to content (e.g., eBooks, games, music, video, and so forth) that have been previously published and at least partly diffused within a population of users or consumers. Environment 900 illustrates implementations in which the products to be modeled as described above include eBooks or other content items that have been published through a self-publishing system. At least some of the elements of the environment 900 may be similarly configured, or may operate in a similar manner, to like-numbered elements shown in the environment 100. The various elements of environment 900 may communicate with one another via one or more networks, as described above with reference to FIG. 1.

As shown in the example of FIG. 9, the environment 900 may include one or more authors 902 interacting with one or more publishing server devices 904. The publishing server device(s) 904 may include any type of computing device, including but not limited to those described above with reference to the analysis server device(s) 102. The author(s) 902 may submit one or more manuscripts 906 to the publishing server device(s) 904. In some cases, the author(s) 902 may submit the manuscript(s) 906 to be self-published as eBooks in any digital format. However, implementations are not limited to self-published eBooks, and the author(s) 902 may also submit other types of content such as audio content, video content, audiovisual content, games, and so forth.

On receiving the submitted manuscript(s) 906, the publishing server device(s) 904 may perform operations to enable the publication of the manuscript(s) 906 as substantially self-published by the author(s) 902. Such operations may include determining whether the manuscript(s) 906 are suitable for publication through the publishing server device(s) 904, performing one or more editorial tasks regarding the manuscript(s) 906, or determining a suitable title, genre, or publishing imprint for the manuscript(s) 906. The author(s) 902 may interact with the publishing server device(s) 904 to provide information regarding pricing, distribution, digital formats, availability, royalties, or other details regarding the publication of the manuscript(s) 906. After publication, information regarding the manuscript(s) 906 may be stored as the product data 114 in the product data storage 108.

For a particular published eBook described by the product data 114(1), the diffusion model generation module 120 may generate a diffusion model that models future sales (or other diffusion) of the self-published eBook. The diffusion model may be generated as described above, and may be stored in the diffusion model data 122. The diffusion model data 122 may be accessed by the prediction module 124, which may generate the prediction data 126. In this example, the prediction data 126 may include predictions of future sales of the self-published eBook at one or more particular date/times in the future, predictions of total future sales of the self-published eBook, predictions of the total future revenues that may be expected from sales of the self-published eBook, and so forth.

The prediction data 126 may be provided to one or more acquisition decision server device(s) 908. The acquisition decision server device(s) 908 may include any type of computing device, including but not limited to those types of devices described above with reference to the analysis server device(s) 102. The acquisition decision server device(s) 908 may execute an acquisition decision module 910, which may perform operations to determine whether to acquire publication rights to the self-published eBook. Based on the prediction data 126 the acquisition decision module 910 may determine a probability that the self-published eBook may generate a particular number of sales or a particular amount of revenue over time. Based on such determinations, the acquisition decision module 910 may generate decision data 912 describing a decision whether to acquire publication rights to the eBook. For example, if the projected revenues of an eBook are above a predetermined threshold amount, a decision may be made to acquire rights to the title.

Figure 10:
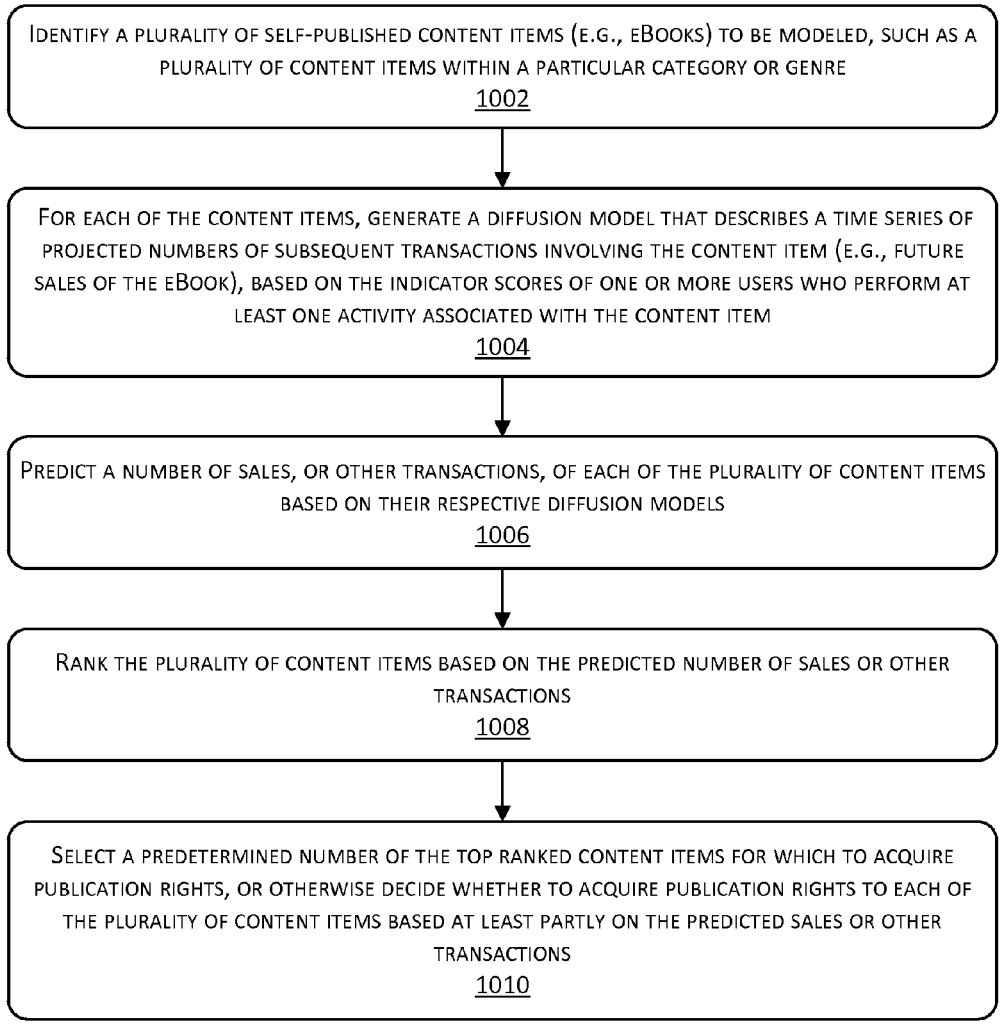
FIG. 10 depicts a flow diagram of a process for generating models to predict the future performance of a plurality of eBooks, and to make rights acquisition decisions based on the models.

FIG. 10 depicts a flow diagram 1000 of a process for generating a diffusion model to predict the future performance of a content item (e.g., an eBook) based on observed activities of users with regard to the content item. One or more operations of the process may be performed by the diffusion model generation module 120, the prediction module 124, other modules of the analysis server device(s) 102, the acquisition decision module 910, other modules of the acquisition decision server device(s) 908, or other modules of other devices.

At 1002, an identification is made of a plurality of self-published content items for which future diffusion (e.g., sales) is to be modeled as described above. The self-published content items may be described in the product data 114, and may have been published by one of the authors 902 through operations of the publishing server device(s) 904. In some cases, the self-published content items may be eBooks. The self-published content items may also include other types of content or other types of products, such as games, audio content, video content, image content, and so forth. In some implementations, the plurality of content items determined at 702 may be within a particular category, sub-category, genre, or type of content items. For example, the process may analyze a plurality of self-published eBooks in the romance, science fiction, or mystery genres of literature, or in other genres.

At 1004, for each of the plurality of content items a diffusion model may be generated that describes a time series of projected numbers of subsequent transactions involving the content item. As described above, the diffusion model may be developed based at least partly on observed activities of one or more users, and based at least partly on the indicator scores of such users.

At 1006, one or more predictions regarding the content item may be generated. As described above, such predictions may be included in the prediction data 126 and may include predictions regarding the numbers of future sales or other types of future transactions that are projected for the content item. For example, the diffusion model may project how many of a particular eBook may be sold in the next 90 days based on the time-series trend of the diffusion model and based on current sales data.

At 1008, the plurality of content items may be ranked based on predicted sales, based on their predicted growth in sales, or based on other types of predictions. Such a ranking may assign a higher ranking to content items that are predicted to generate more sales than other, lower ranked content items.

At 1010, a decision may be made whether to acquire rights to each of the self-published content items, based at least partly on the prediction data 126 generated at 1006. In some cases, the decision at 1010 may include selecting a predetermined number of the top ranked content items for which to acquire publication rights. For example, 50 self-published eBooks in the romance genre may be ranked based on future predicted sales, and the top 10 titles may be selected for rights acquisition. The decision at 1010 may be made by the acquisition decision module 910, in one or more operations that are at least partly automated. Alternatively, the prediction data 126 may be provided to editorial personnel, business analysts, business managers, publishers, or other individuals who decide whether to acquire rights to one or more content items.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and may be encoded in one or more computer-readable storage media as instructions executable on one or more processors.

Embodiments may be provided as one or more computer program products that include one or more non-transitory computer readable storage media having stored thereon instructions (in compressed or uncompressed form) that may be used to program a computer (or other electronic device) to perform processes or methods described herein. The one or more computer readable storage media may include, but are not limited to, one or more of an electronic storage medium, a magnetic storage medium, an optical storage medium, a quantum storage medium, or a mechanical data storage medium. For example, the one or more computer readable storage media may include, but are not limited to, hard drives, floppy diskettes, optical disks, ROMs, RAMs, EPROMs, EEPROMs, flash memory, magnetic cards, optical cards, solid-state memory devices, or other types of physical media suitable for storing electronic instructions. Further, embodiments may also be provided as one or more computer program products including one or more transitory machine-readable signals in a compressed or an uncompressed form. Such machine-readable signals may or may not be modulated using a carrier. Examples of the machine-readable signals include, but are not limited to, signals that a computing system or other machine hosting or running a computer program may be configured to access. Machine-readable signals may include signals transmitted over one or more networks. For example, a transitory machine-readable signal may comprise transmission of software over a network such as the Internet.

Separate instances of the programs may be executed on or distributed across separate computer systems. Thus, although certain steps have been described as being performed by certain devices, software programs, processes, or entities, this need not be the case. A variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method of acquiring products based on user activities, comprising:
    accessing transaction data describing purchases of a plurality of products;
    accessing user activity data describing one or more of: navigation to web pages describing the plurality of products, providing of reviews associated with the plurality of products, providing search queries associated with the plurality of products, consumption of the plurality of products, or use of the plurality of products;
    based on the transaction data and the user activity data, identifying purchases and user interactions associated with a first product by a plurality of users on a plurality of activity dates, the first product included in the plurality of products;
    determining a plurality of indicator scores for the plurality of users, the plurality of indicator scores being based at least partly on numbers of the purchases of the first product that occur after corresponding dates of the plurality of activity dates associated with the plurality of users, the plurality of indicator scores indicating predictive characteristics of the plurality of users with respect to the purchases of the first product by other users;
    determining indicator scores associated with at least a subset of the plurality of users to exceed a threshold indicator score;
    identifying at least one activity performed by the at least a subset of the plurality of users, the at least one activity including one or more of:
        a purchase of a second product;
        a published review of the second product; or
        a use of the second product;
    determining a statistical distribution of the plurality of indicator scores;
    based at least partly on the statistical distribution and the at least one activity, generating a model that describes a time series of projected numbers of subsequent purchases of the second product;
    based at least partly on the model, predicting a number of the subsequent purchases of the second product on at least one future date; and
    based at least partly on the number of the subsequent purchases of the second product on the at least one future date, generating decision data associated with acquisition of the second product, the decision data configured to cause acquisition of a quantity of the second product based on the number of the subsequent purchases.

2. The method of claim 1, the determining of the plurality of indicator scores further comprising:
    calculating the plurality of indicator scores to be a total number of the purchases of the first product that occur between a corresponding date of the plurality of activity dates and a current date.

3. The method of claim 1, the model being based at least partly on a Bass diffusion model, the generating of the model further comprising:
determining an observation dataset including a plurality of observations describing purchases of the second product, each of the plurality of observations describing the second product, a purchaser of the second product, a purchase time of the second product, a price of the second product, and a purchased quantity of the second product.

4. The method of claim 3, the generating of the model further comprising augmenting the plurality of observations in the observation dataset to include one or more of:
a total number of reviews of the second product, determined at the purchase time;
a distribution of ratings of the second product, determined at the purchase time;
a number of searches for the second product, determined at the purchase time;
a pricing history of the second product, determined at the purchase time;
a consumption proportion of the second product, determined at the purchase time; or
at least one product characteristic of the second product.

5. A system, comprising:
at least one memory storing computer-executable instructions; and
at least one processor in communication with the at least one memory, the at least one processor configured to access the at least one memory and execute the computer-executable instructions to perform actions comprising:
identify a first activity performed on respective activity dates by a plurality of users, the first activity being associated with a first product;
determine a plurality of indicator scores for the plurality of users based at least partly on a number of transactions involving the first product that occur after the respective activity dates, the plurality of indicator scores indicating predictive characteristics of the plurality of users with respect to the first product;
identify at least one second activity performed by at least a subset of the plurality of users, the at least one second activity being associated with a second product;
determine a statistical distribution of the plurality of indicator scores;
based at least partly on the statistical distribution and the at least one second activity, generate a model that describes a time series of projected numbers of subsequent transactions involving the second product;
based at least partly on the model, determine a number of the subsequent transactions associated with the second product on at least one future date; and
based at least partly on the number of the subsequent transactions of the second product on the at least one future date, generate decision data associated with acquisition of the second product.

6. The system of claim 5, wherein:
the first product is associated with a product category;
the second product is associated with the product category; and
the plurality of indicator scores indicate the predictive characteristics of the plurality of users with respect to products in the product category.

7. The system of claim 5, wherein the first activity comprises one or more of:
navigating to a web page describing the first product;
providing a review associated with the first product;
providing a search query associated with the first product;
consumption of the first product; or
use of the first product.

8. The system of claim 5, wherein the actions further comprise:
based at least partly on the model, predicting a future date on which a number of the subsequent transactions involving the second product is at a maximum number of transactions.

9. The system of claim 5, wherein the generating of the model is further based on a number of transactions involving the second product during a predetermined time period prior to the generating of the model.

10. The system of claim 5, wherein:
the first activity includes one or more of a purchase, a rental, a consumption, a borrowing, a recommendation, or a review of the first product by the plurality of users; and
the at least one second activity includes one or more of a purchase, a rental, a consumption, a borrowing, a recommendation, or a review of the second product by the at least a subset of the plurality of users.

11. The system of claim 5, the model being based at least partly on a Bass diffusion model, the generating of the model further comprising:
determining an observation dataset including a plurality of observations describing purchases of the second product, each of the plurality of observations describing the second product, a purchaser of the second product, a purchase time of the second product, a price of the second product, and a purchased quantity of the second product.

12. The system of claim 11, the generating of the model further comprising augmenting the plurality of observations in the observation dataset to include one or more of:
a total number of reviews of the second product, determined at the purchase time;
a distribution of ratings of the second product, determined at the purchase time;
a number of searches for the second product, determined at the purchase time;
a pricing history of the second product, determined at the purchase time;
a consumption proportion of the second product, determined at the purchase time; or
at least one product characteristic of the second product.

13. The system of claim 5, wherein:
the first product is a media product that includes one or more of an electronic book, a game, a video file, or an audio file;
the first activity includes a consuming of the media product by the plurality of users; and
the identifying of the first activity includes determining that the media product is consumed by one or more users of the plurality of users with at least a threshold speed.

14. The system of claim 5, wherein:
the first product is a media product that includes one or more of an electronic book, a game, a video file, or an audio file;

the first activity includes a purchase of the media product by the plurality of users; and the identifying of the first activity includes identifying at least one characteristic of performing of the first activity by one or more users of the plurality of users, the at least one characteristic comprising:

a navigation of the one or more users from an external web page to a product web page describing the media product, wherein the product web page is included in a web site that provides the media product for sale, and wherein the external web page is external to the web site; and the purchase of the media product by the one or more users through the product web page after the one or more users have navigated from the external web page to the product web page.

15. One or more non-transitory computer-readable media storing instructions which, when executed by at least one processor, instruct the at least one processor to perform actions comprising:

identifying a first activity performed on respective activity dates by a plurality of users, the first activity being associated with a first product;

determining a plurality of indicator scores for the plurality of users based at least partly on a number of transactions involving the first product that occur after the respective activity dates, the plurality of indicator scores indicating predictive characteristics of the plurality of users with respect to the first product;

identifying at least one second activity performed by at least a subset of the plurality of users, the at least one second activity being associated with a second product;

determining a distribution of the plurality of indicator scores;

based at least partly on the distribution, generating a model that enables a prediction of diffusion of the second product;

based at least partly on the model, determining a number of the subsequent transactions associated with the second product on at least one future date; and based at least partly on the number of the subsequent transactions of the second product on the at least one future date, generating decision data associated with acquisition of the second product.

16. The one or more non-transitory computer-readable media of claim 15, the model being based at least partly on a Bass diffusion model, the generating of the model further comprising:

determining an observation dataset including a plurality of observations describing purchases of the second product, each of the plurality of observations describing the second product, a purchaser of the second product, a purchase time of the second product, a price of the second product, and a purchased quantity of the second product.

17. The one or more non-transitory computer-readable media of claim 16, the generating of the model further comprising augmenting the plurality of observations in the observation dataset to include one or more of:

a total number of reviews of the second product, determined at the purchase time;

a distribution of ratings of the second product, determined at the purchase time;

a number of searches for the second product, determined at the purchase time;

a pricing history of the second product, determined at the purchase time;

a consumption proportion of the second product, determined at the purchase time; or at least one product characteristic of the second product.

18. The one or more non-transitory computer-readable media of claim 15, wherein:

the first product is associated with a product category;

the second product is associated with the product category; and the plurality of indicator scores indicate the predictive characteristics of the plurality of users with respect to products in the product category.

19. The one or more non-transitory computer-readable media of claim 15, wherein the model describes a time series of projected numbers of subsequent transactions involving the second product.

20. The one or more non-transitory computer-readable media of claim 15, wherein the identifying of the first activity associated with the first product further includes identifying a speed at which the first product is consumed by one or more users of the plurality of users.

* * * * *